United States Patent
Schittelkop

(10) Patent No.: US 8,002,533 B2
(45) Date of Patent: Aug. 23, 2011

(54) INJECTION MOLDING MACHINE FOR LOST CORE TECHNOLOGY

(75) Inventor: Volker Schittelkop, Walldürn (DE)

(73) Assignee: Franz Schittelkop GmbH & Co., Walldurn (DE)

( * ) Notice: Subject to any disclaimer, the term of this patent is extended or adjusted under 35 U.S.C. 154(b) by 444 days.

(21) Appl. No.: 12/299,571

(22) PCT Filed: May 4, 2007

(86) PCT No.: PCT/EP2007/003942
§ 371 (c)(1),
(2), (4) Date: Nov. 4, 2008

(87) PCT Pub. No.: WO2007/128511
PCT Pub. Date: Nov. 15, 2007

(65) Prior Publication Data
US 2010/0159064 A1    Jun. 24, 2010

(30) Foreign Application Priority Data
May 5, 2006   (DE) .................. 10 2006 021 083

(51) Int. Cl.
*B29C 45/73* (2006.01)
(52) U.S. Cl. ........ 425/176; 164/113; 164/312; 425/468; 425/DIG. 12
(58) Field of Classification Search ............ 164/113, 164/312; 425/175, 176, 405.1, 468, DIG. 12
See application file for complete search history.

(56) References Cited

U.S. PATENT DOCUMENTS

| 4,008,023 | A | * | 2/1977 | Wentzell ................ 425/DIG. 12 |
| 4,464,324 | A | | 8/1984 | Hager |
| 5,085,569 | A | | 2/1992 | Dauphin |
| 5,257,922 | A | | 11/1993 | Vansnick et al. |
| 5,564,447 | A | | 10/1996 | Niedermair |
| 5,681,518 | A | | 10/1997 | Ashcraft |
| 5,855,237 | A | * | 1/1999 | Okada et al. .................. 164/113 |
| 6,516,866 | B1 | | 2/2003 | Jones |

FOREIGN PATENT DOCUMENTS

| DE | 3149264 | 6/1983 |
| DE | 3724679 | 2/1989 |

(Continued)

OTHER PUBLICATIONS

Altman et al. "Schmelzkerntechnik Im Motorenbau", Kunststoffe, vol. 81, No. 3, Mar. 1, 1991, pp. 179-188.

(Continued)

*Primary Examiner* — Tim Heitbrink
(74) *Attorney, Agent, or Firm* — O'Shea Getz P.C.

(57) ABSTRACT

An injection molding machine (10) comprises an injection molding tool (14) having a mold cavity, in which a molded part can be produced by overmolding a mold core of metal inserted into the mold cavity using an injection molding material, and a melting tool (18) by means of which the mold core overmolded with the injection molding material can be melted out, wherein the melting tool (18) comprises at least one current-carrying element (28) by which eddy currents can be generated in the material of the mold core.

17 Claims, 1 Drawing Sheet

FOREIGN PATENT DOCUMENTS

| | | |
|---|---|---|
| DE | 3736574 | 5/1989 |
| DE | 3829475 | 11/1989 |
| DE | 4215425 | 11/1992 |
| DE | 4237638 | 6/1994 |
| DE | 19530254 | 2/1997 |
| JP | 63227310 | 9/1988 |
| JP | 3146249 | 6/1991 |
| JP | 5200758 | 8/1993 |
| JP | 7001467 | 1/1995 |
| JP | 2002225039 | 8/2002 |

OTHER PUBLICATIONS

"Die Zukunft Der Schmelzkerntechnologie Hat Gerade Erst Begonnen", Plastverarbeiter, vol. 44, No. 5, May 1, 1993, pp. 26-29.

Hauck et al. "Optimization of the Fusible Core Technique for Injection Molding of Thermoplastics", Industrial and Production Engineering, vol. 12, No. 1, 1988, pp. 24-26.

Haldenwanger et al.: "Kunststoff-Motorbauteile in Ausschmelzkerntechnik am Beispiel eines Saugrohres", Kunstsoffsaugrohr-Entwicklung.

* cited by examiner

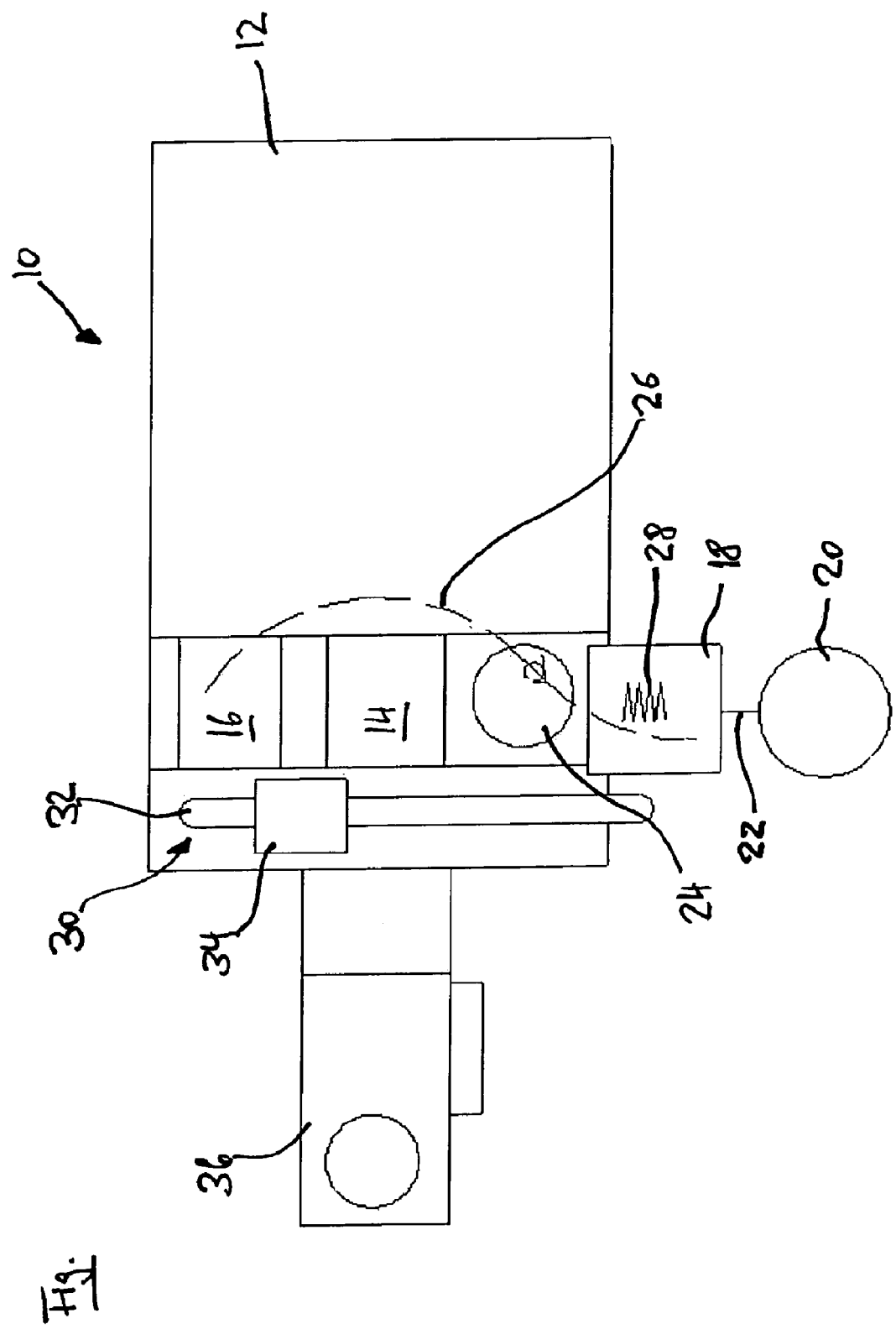

INJECTION MOLDING MACHINE FOR LOST CORE TECHNOLOGY

This application is entitled to the benefit of, and incorporates by reference essential subject matter disclosed in PCT Application No. PCT/EP2007/003942 filed on May 4, 2007 which claims priority to German Application No. 10 2006 021 083.2 filed May 5, 2006.

BACKGROUND OF THE INVENTION

1. Technical Field

The present invention relates to an injection molding machine comprising an injection molding tool having a mold cavity, in which a molded part can be produced by overmolding a mold core made of metal and inserted into the mold cavity using an injection molding material, and a melting tool by means of which the mold core overmolded with the injection molding material can be melted out.

2. Background Information

It is known to produce workpieces having a mostly elongate cavity in an injection molding process using lost-core technology. Examples of workpieces molded by this technology are e.g. intake manifolds for vehicle motors, coolant lines in motor vehicles and the like.

In lost-core technology, a mold core of an easily meltable material (e.g. a bismuth alloy) is produced first and inserted in a mold cavity of an injection-molding mold. Thereafter, the mold core is overmolded with the injection molding material proper and removed from the mold together with the enclosed (solid) mold core. For removing the mold core, it has been common practice in lost-core technology so far to melt out the mold core by immersion of the molded part, that has been removed from the mold, into a bath of a melting liquid (e.g. an alcohol compound commercially offered under the trade name "Lutron" from BASF AG). The liquefied core is then removed and reused for making a new mold core. The molded part is removed from the Lutron bath, cleaned and then processed further.

With conventional injection molding systems used for lost-core technology, it is necessary to have a production line comprising as separate components: an injection molding machine, a core molding machine, a plurality of robots, a core melting bath containing Lutron as melting liquid, a heating for the melting liquid, a large heated container for the melting liquid, a washing means for removing the melting liquid from the molded part, and a drying station for the molded part. Especially the relatively large heated container for the melting liquid as well as the additional precautions for cleaning and drying the workpieces from the melting liquid after the melting operation necessitate corresponding expenditure in terms of space. Such a production line thus is comparatively expensive as regards to both the purchase and the operating costs of the same. Thus, despite qualitatively attractive results, the lost-core technology so far has been deemed uneconomical for many applications, and often other processes (e.g. vibration welding processes) were used instead which, however, did not yield comparable results. The vibration welding technology, used often for the production of molded parts with elongate cavities, such as pipes, for example has the disadvantage that welding flanges are necessary on the workpiece for being able to weld together two workpiece halves. As the welding flanges are protruding from the finished workpiece, they impair the appearance, and in case of narrow installation conditions, as these are frequent in automotive engineering, they lead to problems in terms of space.

Therefore, it would be desirable to be able to produce, by way of lost-core technology, parts used in particular in the field of automotive engineering with reasonable expenditure. It is thus an object of the invention to make available an injection molding system suitable for lost-core technology, which operates with clearly lower expenditure than conventional known systems.

SUMMARY OF THE INVENTION

According to the invention, this object is met with an apparatus of the type mentioned in that the melting tool comprises at least one current-carrying element through which eddy currents can be generated in the material of the mold core.

According to the invention and in contrast to the common practice used so far in lost-core technology, the mold core consisting e.g. of a bismuth alloy is not melted out by immersion of the cast and overmolded mold part into a bath of a Lutron solution, but is caused to melt by electromagnetic induction. In doing so, eddy currents are generated in the mold material, causing the core to melt. The melted core can be suction-withdrawn by a pump in the form of a liquid melted mass and may be pressurized and reused for making a new core.

As soon as there is electric current flowing through the current-carrying element, said element produces a magnetic field. When the electric current changes in the course of time, the magnetic field, concomitantly changed in time therewith, produces eddy currents in an electrically conductive body located in the magnetic field, resulting in a temperature increase of the electrically conductive body. This principle of induction heating has the specific advantage that, for transferring energy causing heating of the mold core to the mold core, it is not necessary to heat the overmolded plastic material of the molded part from the outside, but that the temperature increase of the mold core can be produced purposefully in the material of the mold core made of metal.

The novel utilization of induction heating for melting out the core material allows the use of melting liquid to be dispensed with. This provides advantages with respect to the expenditure to be employed for the process as well as the safety of the process. Especially the latter aspect plays an important role as there was an enormous risk of fire in heating the alcohol compound used in the prior art as melting liquid. In addition thereto, all precautions for storing and circulating the melting liquid, in particular the provision of a large heated container for the melting liquid, can be dispensed with according to the invention. It is no longer necessary, either, after melting and removing the mold core, to clean and dry the workpieces from the melting liquid in laborious operations. Thus, it has become possible for the first time to build a compact injection molding machine containing all components required for producing workpieces by lost-core technology.

As regards to the current-carrying element, in particular suitably designed induction coils or induction coil arrangements may be used that are disposed around the overmolded part. In doing so, the molded part in the melting tool will be arranged preferably in the region of the inner space of the induction coils in which the magnetic field lines are closest to each other. It is then already possible, with relatively low power consumption and compact coil dimensions, to easily produce sufficient temperature increases in the mold core.

The melting tool may comprise a closable or sealable chamber adapted to accommodate the molded part therein. The closable chamber on the one hand may be integrated in the injection molding tool and be constituted e.g. by the mold cavity of the injection molding tool proper, so that the mold core overmolded with the injection molding material can be caused to melt in the injection molding tool proper. The course of operations is thus simplified, and the injection molding machine may be given an extremely compact construction. With this kind of construction, it is advantageous to integrate the current-carrying element in the injection molding tool; the injection molding tool then should be made of a material that is not heated too much by the induction process employed. For example, the injection molding tool may be made of an electrically not conducting material, but also steel is well suited as material for the injection molding tool as the low thermal conductivity of steel in comparison to that of the material for the melting core also has the effect that the injection molding tool is subject to lesser heating as compared to the melting core. The thermal energy causing heating of the injection molding tool in that event may even be dissipated via a moderate-heating oil circuit having a heat pump and may be used for other functions, e.g. for moderately heating a mold core material line having a mold core material pump, by means of which melted mold core material is conveyed.

On the other hand, the closable chamber as an alternative may be provided separately from the injection molding tool. The overmolded part together with the mold core then is removed from the injection molding tool and introduced into the closable chamber. In the latter, the mold core is caused to melt by electromagnetic induction. In both cases, the melted core then may be simply discharged and e.g. may be reused for making a new mold core.

Irrespective of whether the melting tool is integrated in the injection molding tool and melting out of the mold core is effected in the injection molding tool or whether the melting tool is formed separately of the injection molding tool, the current-carrying element, in the simplest form, can be arranged inside the closable chamber, e.g. it may be arranged or formed on the inner walls of the chamber. The current-carrying element then may extend immediately adjacent the molded part, permitting on the one hand a particularly compact design of the melting tool and necessitating on the other hand relatively little current consumption only. For example, the current-carrying element may also be matched to the outer surface of the molded part. A particular advantage of this arrangement resides in that the heating capacity may be matched to the mass of the mold core to be melted, so that a relatively large heating capacity may be generated (i.e. there may be generated stronger eddy currents) e.g. at locations near large mold core volumes, whereas a lower heating capacity may be produced at other locations.

The current-carrying element may also be arranged outside the closable chamber, either as an alternative to the aforementioned arrangement inside the chamber or also as an additional measure thereto. For example one or more induction coils of suitable shape can extend around the walls of the closable chamber and/or may be attached to the outer walls of the same. Thus, the assembly of chamber and current-carrying element then may be used with various molded parts as long as the latter can be accommodated in the chamber.

The chamber preferably can be evacuated. In so far as melting out takes place in the injection molding tool proper, this means that the mold cavity can be evacuated. Melting and removal of the mold core then is effected under vacuum conditions. It is thus prevented that the melted core material is contacted with oxygen in the air and oxidizes, which would exclude reuse of the mold core material. Similar oxidation protection may be achieved conventionally by means of the melting liquid (with disproportionately higher expenditure).

As an alternative, the chamber (or optionally the mold cavity of the injection molding tool) could be fillable with a preferably gaseous protective fluid, so that melting of the mold core can be effected in a corresponding protective environment, optionally under excess or positive pressure. In particular, it may be considered here to effect melting in a protective gas atmosphere of nitrogen or optionally an inert or noble gas.

It is advantageous when there is provided a mold core conveying means through which the melted mold core material can be discharged from the mold part. In this case, the molded part preferably is located in the melting tool. The mold core conveying means may have a pump arrangement through which the at least one line communicating with or adapted to be communicated with the liquid mold core material can be subjected to vacuum or negative pressure so that the melted mold core material may be suction-withdrawn. The term "melted" is to be understood here as a state in which the viscosity of the mold core material is sufficiently low to permit at least a viscous flow.

As an alternative, the mold core conveying means may comprise a compressor arrangement and/or a slide arrangement through which a force can be applied to the mold core material in order to push out melted mold core material from the molded part. In particular, this can be realized in that at least one line communicating with or adapted to be communicated with the melted mold core material and filled with an inert fluid (e.g. nitrogen or an inert hydraulic liquid), can be subjected to positive pressure in order to push out melted mold core material through another external opening of the molded part. As slide arrangement, there may be used e.g. a hydraulic cylinder having an attached collecting cylinder.

The injection molding machine, moreover, may comprise a mold core tool through which the mold core can be produced, and optionally also a conveying means for conveying the mold core from the mold core tool to the injection molding tool and for inserting the mold core into the injection molding tool when the mold core tool is formed separately from the injection molding tool. It is advantageous then to provide for means through which the melted mold core material can be returned from the melting tool to the mold core tool. For example, there may be provided one or more lines connecting the melting tool to the mold more tool. The cross-section of these lines is to be selected in accordance with the viscosity of the mold core material, the length of the lines and the power of the mold core conveying means. Insulation and/or heating of this line optionally may be provided as well.

The mold core tool may comprise e.g. a second mold cavity as well in which a component to be cast, that is a component part of the molded part to be produced (e.g. a control valve), can be introduced and then be overmolded with a melting core material so as to form the mold core. In this manner, the injection molding machine according to the invention may also be utilized for producing molded parts in so-called multicomponent technology (e.g. two-component or three-component technology).

There may also be provided a conveying means through which the molded part can be removed from the injection molding tool and be conveyed to the melting tool. A conveying means optionally can be designed such that it is suited both for transporting the mold core from the molding tool to the injecting molding tool and for transporting the molded part from the injection molding tool to the melting tool.

To achieve, also in case of a complex geometry of the mold core and its corresponding cavity in the molded part, as complete as possible withdrawal or flowing off of the liquefied mold core material from the molded part, it is advantageous when the molded part is movably supported in the melting tool, in particular rotatably or pivotably supported. Corresponding adjusting means (e.g. a pivot drive about up to three axes) may easily be integrated as part of the afore-mentioned conveying means as well.

An additional advantage results when the support of the molded part in the melting tool permits also vibration movement of the molded part so as to enhance or accelerate the discharge of the liquefied mold core material. To this end, a vibration drive may be associated e.g. with a pivot shaft for supporting the molded part. The vibration drive in addition thereto may be utilized for reciprocating the molded part in the magnetic field of the induction coil(s) having current flowing therethrough, so as to induce eddy currents in the mold core, causing the latter to liquefy. In that event, melting out of the core may be effected even by electric dc current through the induction means.

Due to the fact that the injection molding machine according to the invention does not need any components requiring much space, the injection molding machine may be provided in the form of a compact individual machine module accommodating at least the injection molding tool and the melting tool and optionally the mold core tool. The space requirements thus are hardly higher than in case of conventional automatic welding machines or injection molding machines without lost-core technology. The individual machine module may comprise a housing accommodating all components.

In addition thereto, in or at the individual machine module there may be provided a conveying means through which, after removal of the mold core, the molded part can be removed from the melting tool, and optionally the molded part with the mold core can be transported from the injection molding tool to the melting tool and optionally the mold core can be transported from the mold core tool into the injection molding tool. The conveying means optionally may be integrated in the housing as well. The compact individual machine module may then have a robot manipulator e.g. for performing the separate process steps or for transporting the molded part from one process step to the next step, said robot manipulator being preferably controlled centrally. The injection molding machine then is not only compact but also may be used in extremely flexible manner.

The mod core preferably is made of a bismuth alloy. Alloys e.g. with a bismuth content of approx. 90% by weight have turned out particularly advantageous. The melting temperature of the mold core material should be so low that, with this temperature, there is not yet a strong softening effect of the overmolded plastic material taking place. With a melting temperature of less than 160° C., preferably approx. 140° C., they have not yet caused serious deformations of the injection molding material.

The heating capacity of the melting tool may be adjusted in accordance with the softening temperature of the injection molding material used, e.g. so that the temperature of the molded part is at the most approx. 175° C. Due to the fact that according to the invention mainly the mold core material is heated and only the molded core transfers heat to the overmolded plastic material, this is as a rule sufficient for causing complete melting of the mold core.

The molded part preferably has a tubular cavity. The mold core then may simply flow out of the molded part from both open ends of the same.

Suitable as injection molding material is a number of thermoplastic plastic materials, thermosetting plastic materials and also mixed forms thereof. Relatively heat-resistant plastic materials, used for making e.g. intake manifolds for vehicle motors or cooling water manifolds, are particularly suited.

The present invention will be elucidated in more detail in the following with reference to the accompanying drawing.

BRIEF DESCRIPTION OF THE DRAWINGS

The sole drawing FIGURE shows a highly simplified schematic representation of an inventive injection molding machine and the components thereof.

DETAILED DESCRIPTION OF THE INVENTION

The lost-core type injection molding machine 10 illustrated in the drawing comprises an injection molding machine body 12 including all drive, control and accessory components necessary for a conventionally known injection molding machine, except for the injection molding tool 14 proper that is attached to the injection molding machine body 12. The injection molding machine body 12 has enlarged tool mounting plates having the injection molding tool 14 mounted centrally thereon and having mounted thereon laterally or vertically offset from the injection molding tool 14, a mold core tool 16 that is designed as mold core casting tool for casting a mold core. The lost-core injection molding machine 10 thus does not require a separate mold core casting machine, but rather there is employed only one single injection molding machine having two tools associated therewith through which one or more mold cores and one or more molded parts can be produced. This saves space and investment expenditure for the system as a whole.

The mold core tool may also comprise a separate closing-force pressure pad, not shown. The closing force for the mold core tool 16 then can be produced and controlled in independent manner.

A melting chamber 18 that is adapted to be sealed hermetically and evacuated and serves for vacuum melting-out of the mold core material is attached to the injection molding machine body 12 in laterally or vertically offset manner from the injection molding tool 14, on the opposite side of the injection molding tool 14 from the core casting tool 16. In addition thereto, the injection molding machine 10 has a vacuum pump 20 associated therewith for generating a vacuum in the melting chamber 18. The vacuum pump 20 communicates with the vacuum chamber 18 via a vacuum line 22 and is controlled via the control of the injection molding machine 12.

Between injection molding tool 14 and vacuum chamber 18, the embodiment illustrated has a mold core material pump 24 for conveying liquefied mold core material from the melting chamber 18 to the mold core tool 16 via a mold core material line 26 indicated in dashed manner. Beside or instead of the mold core material pump 24, there may also be provided a hydraulic injection unit for injecting liquefied mold core material into the mold core tool 16 for reuse of the same.

An induction means 28, e.g. in the form of a coil, is provided in the vacuum chamber 18 in the embodiment illustrated. The induction means 28 is electrically connected to a current source, not shown, that is controlled by the control of the injection molding machine 12 as well. When electric contact is established between the induction means 28 and the current source, electric current flows through the induction means 28, with the result that a magnetic field is generated in the vicinity of the induction means 28.

When a molded part containing a mold core is introduced into the vacuum chamber 18 and the connection between the induction means 28 and the current source is activated, the molded part is located in the sphere of a magnetic field generated by the induction means 28. If the magnetic flux of this magnetic field penetrating the molded part is variable in terms of time, the magnetic field generates eddy currents in the mold core of the molded part. A temporal change of the magnetic flux can be achieved either by a temporal change of the current flowing through the induction means 28 and/or also by moving the molded part in the magnetic field, e.g. by operation of a vibration means associated with the support of the molded part. The eddy currents lead to heating of the mold core and in the end melting of the mold core.

The induction means 28 may also be provided externally of the vacuum chamber 18, as long as it is guaranteed that the magnetic flux of the magnetic field generated by the induction means 28 is not shielded by the walls of the vacuum chamber 18.

Associated with the vacuum chamber 18 is a turning and pivoting device, not shown, by means of which the molded part is supported so as to be movable in the vacuum chamber. In particular, the molded part is supported to be pivotable about at least one axis, preferably about three axes, and thus can be pivoted in such a manner that the liquefied mold core material, under the effect of gravity, can flow out from the molded part through a downwardly directed opening—preferably in the longitudinal direction of an elongate mold core or cavity in the molded part. With a more complex geometry of the mold core, it is optionally also possible to approach several flow-out locations for the liquefied mold core material one after the other. For enhancing flow-out, in particular for initiating a flow movement of the liquefied material or for accelerating the flow-out speed, the turning and pivoting means additionally has a vibration means, not shown, associated therewith through which the molded part can be reciprocated along one of its pivot axes.

For allowing the mold core material to flow off, a valve arranged in the mold core material line 26 is opened upon a corresponding control command. The mold core material line 26 comprises connecting hoses or pipes and funnels that are all heatable so as to prevent solidification of the liquefied mold core material.

Moreover, the injection molding machine comprises a robot 30 having a manipulator arrangement 34 that is movable along a rail 32. The manipulator arrangement 34 includes one or more grippers allowing gripping both of the mold core and of the molded part. The manipulator arrangement can be moved from the mold core tool 16 to the injection molding tool 14 and from there onwards to the vacuum chamber 18, with the mold core or the molded part being adapted to be introduced by the manipulator arrangement 34 into the respective tool and to be held therein or released from the same and conveyed to the next working station.

A typical sequence of operations for producing a molded part having a cavity by means of the injection molding machine 10 illustrated in the FIGURE is as follows: Firstly, a mold core is cast in the mold core tool 16. The mold core then is removed from the mold core tool by the robot manipulator 34, the robot manipulator is displaced along the rail 32 to the injection molding tool, and the mold core then is introduced by the robot manipulator 34 into the injection molding tool 14. In the latter, the mold core is overmolded with plastic material. Finally, the molded plastic part together with the overmolded mold core is removed by the robot manipulator 34. The robot manipulator 34 is displaced along rail 32 to the vacuum chamber 18 and introduces the molded part into the vacuum chamber 18 that is closed in vacuum-tight manner as soon as the molded part has been inserted. Thereafter, the vacuum pump 20 evacuates the vacuum chamber and produces a vacuum therein. The current supply to the induction coils 28 is turned on and the mold core is melted out. The valve of the mold core line 26 is opened as soon as the mold core material has liquefied sufficiently, and the mold core material is drawn off by the pump 24 and returned to the mold core tool 16 where it is injected anew for producing a new mold core in a subsequent cycle. The plastic part, that now has a hollow or cavity, is removed from the vacuum chamber 18 by the robot manipulator 24 and is conveyed to a processing line 36 for further processing.

The injection molding machine according to the invention is also suitable for producing combined parts (e.g. in two- or three-component injection molding operation), such as e.g. closed ventilation pipes having an injection-molded control valve therein. For producing combined parts, a so-called family tool is installed in the injection molding tool 14, which in case of said ventilation pipe e.g. serves for making a ventilation pipe and an inner closure flap or control valve. In this case, a control valve is produced first in a first recess of the injection molding tool 14, the robot manipulator 34 then removes the valve from the first recess in the injection molding tool 14 and introduces the same into the mold core tool 16 where the valve or flap is overmolded with mold more material. The robot manipulator 34 then removes the mold core with the molded-in valve and places the same again into the injection molding tool 14 where the mold core is overmolded with plastic material. The further sequence of operations is the same as described hereinbefore.

The valve material need not be identical with the material of the pipe, and in selecting the flap or valve material, the rules of the pipe manufacturers as regards to the connection or partial melting suitability of both materials are considered so as to prevent sticking of the valve support. This technology offers a high degree of rationalization and very good leak tightness.

Melting out is effected under vacuum conditions. This prevents that the melted core material establishes contact with oxygen in the air and thus provides for oxidation protection. As an alternative, it would also be possible to provide in the vacuum chamber 18 a protective gas atmosphere e.g. of nitrogen or an inert or noble gas, in which melting out takes place. Melting out then can be carried out under an arbitrary pressure, in particular a positive pressure, so as to exclude the intrusion of surrounding air.

Used as mold core material are metal alloys having an as low as possible melting point. In practical use, certain alloys containing as main constituent bismuth have proven successful. The melting temperature should be under 160° C. for avoiding damage to the plastic coating, and ideally it should be about 140° C. The induction performance then can be adjusted such that the temperature in the region of the workpiece or the core thereof reaches a maximum of 175° C.

Conceivable workpieces to be produced are in particular plastic bodies with elongate, preferably tubular cavities, with the plastic bodies being made of a relatively heat-resistant plastic material, e.g. intake manifolds for vehicle motors or parts thereof, as well as coolant, oil and air lines or pipes for vehicle motors. Such workpieces so far were made mostly by (vibration) welding, with the disadvantage that welding flanges are necessary on the workpiece that project from the finished workpiece and thus may cause problems in terms of space. In addition thereto, defects in the welding seam may lead to deficiency of the entire component.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed herein as the best mode contemplated for carrying out this invention.

What is claimed is:

1. An injection molding machine, comprising an injection molding tool having a mold cavity, in which a molded part can be produced by overmolding a mold core of metal inserted into the mold cavity using an injection molding material, and
   a melting tool wherein the mold core can be melted out of the molded part,
   wherein the melting tool comprises at least one current-carrying element by which eddy currents can be generated in the material of the mold core, and
   wherein the melting tool comprises a closable chamber adapted to accommodate the molded part therein,
   wherein the chamber is adapted to be evacuated.

2. The injection molding machine of claim 1,
   characterized in that the current-carrying element comprises at least one induction coil.

3. The injection molding machine of claim 1,
   characterized in that the current-carrying element is arranged inside of the chamber.

4. The injection molding machine of claim 1,
   characterized in that the current-carrying element is arranged outside of the chamber.

5. The injection molding machine of claim 1,
   characterized by a mold core conveying means adapted to convey melted core material out of the molded part.

6. The injection molding machine of claim 5,
   characterized in that the mold core conveying means comprises a pump arrangement having at least one line communicating with or adapted to be communicated with the liquid mold core material can be subjected to vacuum pressure for suction-withdrawing the melted mold core material.

7. The injection molding machine of claim 5,
   characterized in that the mold core conveying means comprises a compressor arrangement and/or slide arrangement adapted to exert a force on the mold core material for pushing the melted mold core material out of the molded part.

8. The injection molding machine of claim 1, characterized by a mold core tool adapted to produce the mold core, and a conveying means for transporting the mold core from the mold core tool to the injection molding tool and for inserting the mold core into the injection molding tool.

9. The injection molding machine of claim 8,
   characterized in that the melted mold core material is adapted to be returned from the melting tool to the mold core tool.

10. The injection molding machine of claim 1,
    characterized by a conveying means through which the molded part can be removed from the injection molding tool and transported to the melting tool.

11. The injection molding machine of claim 1,
    characterized in that the molded part is supported in the melting tool so as to be movable, and is rotatably or pivotably supported.

12. The injection molding machine of claim 1,
    characterized in that the melting tool has a vibration drive associated therewith wherein the molded part arranged in the melting tool can be reciprocated.

13. The injection molding machine of claim 1,
    characterized in that the machine is in the form of an individual machine module accommodating therein at least the injection molding tool and the melting tool and the mold core tool.

14. The injection molding machine of claim 13,
    characterized by a conveying means provided in or at the individual machine module, wherein after removal of the mold core, the molded part can be removed from the melting tool, the molded part with the mold core can be transported from the injection molding tool to the melting tool and the mold core can be transported from the mold core tool into the injection molding tool.

15. The injection molding machine of claim 1,
    characterized in that the heating capacity of the melting tool is designed such that the temperature of the mold part is at maximum approx. 175° C.

16. The injection molding machine of claim 1,
    characterized in that the injection molding material comprises a thermoplastic plastic material.

17. The injection molding machine of claim 1,
    characterized in that the injection molding material comprises a thermosetting plastic material.

* * * * *